(12) United States Patent
Chen et al.

(10) Patent No.: US 11,407,541 B2
(45) Date of Patent: Aug. 9, 2022

(54) LARGE INDUSTRIAL VACUUM SEALER SYSTEM

(71) Applicants: Wuhu Innovation New Materials Co., Ltd., Anhui (CN); Nanjing Tech University, Jiangsu (CN)

(72) Inventors: Zhou Chen, Anhui (CN); Jiaduo Li, Anhui (CN); Tengzhou Xu, Anhui (CN)

(73) Assignees: WUHU INNOVATION NEW MATERIALS CO., LTD.; NANJING TECH UNIVERSITY

( * ) Notice: Subject to any disclaimer, the term of this patent is extended or adjusted under 35 U.S.C. 154(b) by 101 days.

(21) Appl. No.: 17/015,364

(22) Filed: Sep. 9, 2020

(65) Prior Publication Data
US 2021/0078741 A1 Mar. 18, 2021

(30) Foreign Application Priority Data
Sep. 15, 2019 (CN) .......................... 201910867830.7

(51) Int. Cl.
| | | |
|---|---|---|
| *B65B 31/02* | (2006.01) | |
| *F04B 37/14* | (2006.01) | |
| *F04B 41/06* | (2006.01) | |
| *F04C 18/12* | (2006.01) | |
| *F04C 25/02* | (2006.01) | |
| *G01V 8/10* | (2006.01) | |

(52) U.S. Cl.
CPC ............. *B65B 31/02* (2013.01); *F04B 37/14* (2013.01); *F04B 41/06* (2013.01); *F04C 18/126* (2013.01); *F04C 25/02* (2013.01); *G01V 8/10* (2013.01)

(58) Field of Classification Search
CPC .......... B65B 31/02; F04B 37/14; F04B 41/06; F04C 18/126; F04C 25/02; F04F 9/00; G01V 8/10
See application file for complete search history.

(56) References Cited

U.S. PATENT DOCUMENTS

| | | | | |
|---|---|---|---|---|
| 2,379,436 A | * | 7/1945 | Hickman | F04F 9/00 34/76 |
| 2,522,969 A | * | 9/1950 | Smith | F04F 9/08 250/580 |
| 2,676,440 A | * | 4/1954 | Campbell | B65B 31/02 53/434 |
| 2,880,323 A | * | 3/1959 | Reinecke | H01J 49/24 250/289 |

(Continued)

*Primary Examiner* — Nicolas A Arnett
(74) *Attorney, Agent, or Firm* — McCarter & English, LLP

(57) ABSTRACT

The present invention proposes a large industrial vacuum sealer system. The system comprises the following working steps: after materials are placed, a box base moves upwards to be jointed with a box cover in a sealing manner; the first valve 120 is switched on; a rotary vane pump starts roughly pumping the air; next, a roots pump starts working; when the pressure reaches a preset value, the first valve 120 is switched off; valves 110 and the second valve 130 are switched on; diffusion pumps start working; after the air is pumped out completely, all pumps stop working. A box body comprises the box cover and the box base, wherein the box body is fixedly mounted. The box base is driven by air cylinders to move along a rail. In the present invention, a light curtain sensor is mounted between the box cover and the box base.

6 Claims, 2 Drawing Sheets

(56) References Cited

U.S. PATENT DOCUMENTS

| | | | | |
|---|---|---|---|---|
| 4,770,609 | A * | 9/1988 | Uchida | F04C 28/08 |
| | | | | 417/247 |
| 6,056,510 | A * | 5/2000 | Miura | F04B 37/14 |
| | | | | 417/19 |
| 8,753,095 | B2 * | 6/2014 | Bruce | F04D 15/0077 |
| | | | | 417/423.4 |
| 11,111,922 | B2 * | 9/2021 | Coeckelbergs | F04C 28/02 |
| 11,187,222 | B2 * | 11/2021 | Galtry | F04D 19/046 |
| 2006/0060259 | A1 * | 3/2006 | Devitt | H01L 21/68 |
| | | | | 220/592.27 |
| 2018/0112666 | A1 * | 4/2018 | Dreifert | F04C 28/06 |
| 2020/0038942 | A1 * | 2/2020 | Marcin, Jr. | B22D 43/004 |

* cited by examiner

LARGE INDUSTRIAL VACUUM SEALER SYSTEM

CROSS-REFERENCE TO RELATED APPLICATIONS

This application is a non-provisional application, which claims priority to Chinese Patent Application No. 201910867830.7, filed Sep. 15, 2019, which is incorporated herein, in its entireties, by reference.

TECHNICAL FIELD

The present invention is a vacuum sealer system, comprising a vacuumizing system and a box body system, and in particular, relates to industrial mass production.

BACKGROUND

In the traditional vacuum sealer system, the air extraction pipe between the vacuumizing system and the box body system is usually mounted on one side of the box body singly or in pairs. So, even if vacuum encapsulation can be achieved finally, the internal pressure of the box body is uneven in the working process. Pressure gradient is formed from a pipe opening to a position away from the pipe opening, so as to influence the vacuum encapsulation speed and quality. Furthermore, in the box body system which moves up and down, only depending on a stop button, the safety of workers cannot be ensured and safety accidents happen occasionally.

Therefore, a novel vacuum sealer system should be proposed to increase the vacuum encapsulation speed and improve the vacuum encapsulation quality. According to the system of the present invention, two air extraction pipes are respectively mounted at the upper portion of a box cover and the bottom of a box base. Additionally, light curtain sensors are mounted on a box body. In a box base moving process, if meeting a barrier, the box base immediately stops moving and resets, thereby improving the safety of the working process.

SUMMARY

In view of low speed, poor quality and low safety of the traditional vacuum sealer, the present invention proposes a large industrial vacuum sealer system, which can balance the pressure gradient and improve the safety.

As an improvement, the large industrial vacuum sealer system comprises two subsystems, including a vacuumizing system and a box body system. The vacuumizing system comprises a roots pump, a rotary vane pump, a holding pump, and diffusion pumps. The roots pump and the rotary vane pump are connected with the first pipe. The first pipe is connected with the second pipe. The second pipe is connected with the third pipe. The end ports of the second pipe and the third pipe are located at the upper ends of the diffusion pumps, so as to connect the upper ends of the diffusion pumps with the roots pump and the rotary vane pump. The fourth pipe and the fifth pipe are connected with the bottoms of the diffusion pumps. The two pipes are communicated with each other and then are connected to the sixth pipe. The sixth pipe is connected with the holding pump through the seventh pipe and is connected with the first pipe through the eighth pipe.

As an improvement, the first valve is mounted at the end part of the second pipe, and the second valve is mounted at the end part of the sixth pipe.

As an improvement, a box body comprises a box cover and a box base. The box body is connected with the diffusion pumps through the first air extraction pipe at the top of the box cover and the second air extraction pipe at the bottom of the box base. An extensible and retractable spring tube is arranged at the end part of the second air extraction pipe.

As an improvement, the box cover is fixedly mounted through a support, and the support is fixedly connected to the ground. The box base can move up and down in a reciprocating manner along guide columns through the first air cylinders, and the first air cylinders are arranged at the four corners of the box base.

As an improvement, light curtain sensors are mounted at the box cover and the box base.

As an improvement, a frame body is fixedly mounted in the box cover. There are encapsulation groups on the frame body. Each encapsulation group comprises a fixedly mounted supporting plate and two pressing plates, and the pressing plates are oppositely symmetrically distributed and can synchronously move by the second air cylinders.

Further, the present invention also proposes a mounting method, specifically comprising the following steps:
(1). the box cover is fixed, and the box base moves up and down; when the box cover and the box base are jointed, the sealing performance of the box base and the box cover as well as the pipe connectors should be ensured;
(2). the productivity may be improved by increasing the encapsulation groups; but there are at most three encapsulation groups;
(3). the spring tube may be extended and retracted in a large range.

Utilizing such structure, the two air extraction pipes are respectively connected with the box cover and the box base; so, the internal pressure is more balance. Furthermore, the productivity can be improved by increasing the encapsulation groups. Besides, the light curtain sensors are mounted on the box body to avoid personnel injury caused by incorrect operations and to improve the operation safety.

Specifically, the present invention has the following advantages:
(1). the two air extraction pipes are respectively mounted on the box cover and the box base; so, the internal pressure of the box body is more balance;
(2). the light curtain sensors are mounted on the box body, so as to improve the operation safety.

DESCRIPTION OF THE EMBODIMENTS

The following further describes the present invention with reference to the specific embodiments. It should be understood that these embodiments are merely intended for describing the present invention, but not for limiting the scope of the present invention. After reading the present invention, those skilled in the art may make various equivalent forms of modifications to the present invention, and these modifications should be defined by the appended claims of the present invention.

Figure 1:
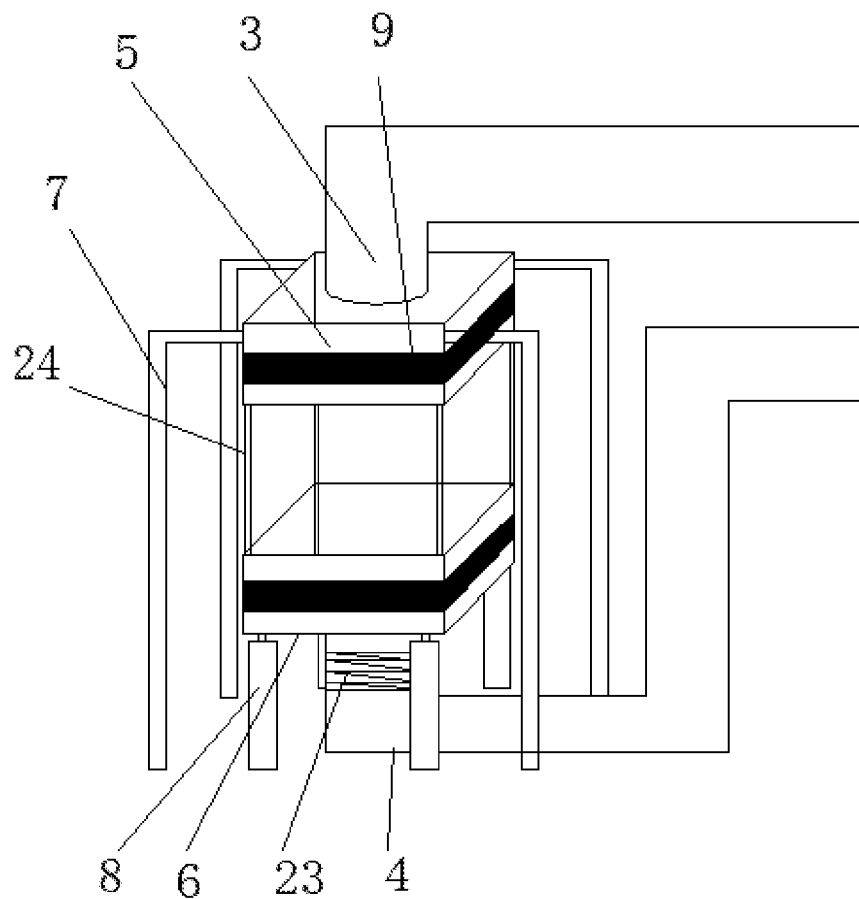
FIG. 1 is a diagram of a box body system.
Figure 2:
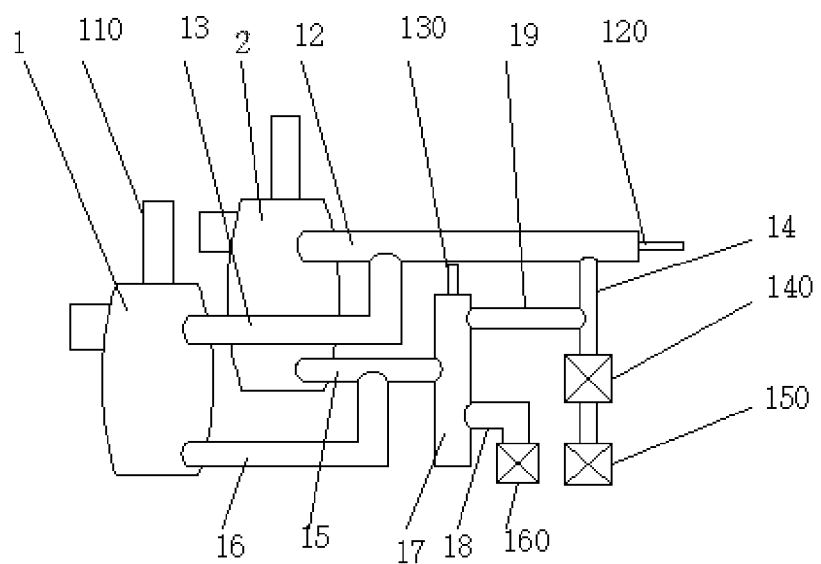
FIG. 2 is a perspective view of a vacuumizing system.
Figure 3:
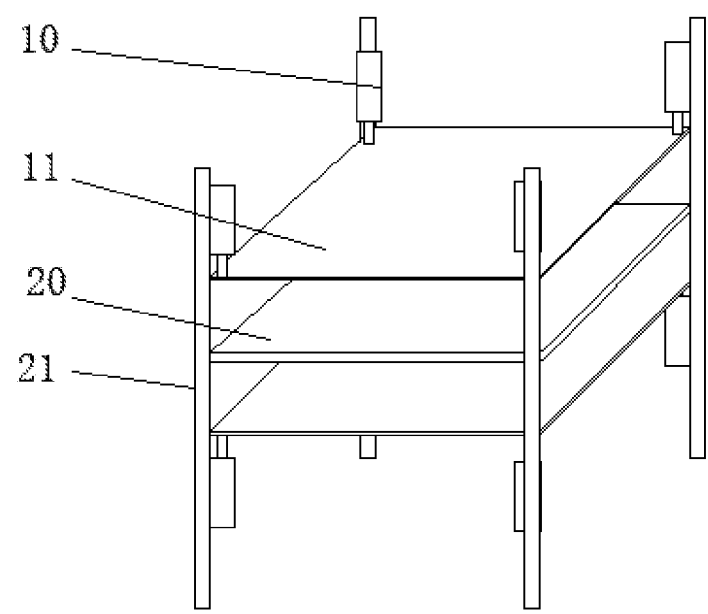
FIG. 3 is a structural diagram of a frame body.
In the drawings: 1—diffusion pump I, 2—diffusion pump II, 3—upper air extraction pipe, 4—lower air extraction pipe, 5—box cover, 6—box base, 7—support, 8—box base air cylinder, 9—light curtain sensor, 10—pressing plate air cylinder, 11—pressing plate, 12-19—connecting pipe, 20—supporting plate, 120 and 130—valve, 140—roots pump, 150—rotary vane pump, and 160—holding pump.

Referring to FIG. 1 to FIG. 3, a large industrial vacuum sealer comprises two subsystems, including a vacuumizing system and a box body system. The vacuumizing system comprises a diffusion pump 1, a diffusion pump 2, a roots pump 140, a rotary vane pump 150, and a holding pump 160. The rotary vane pump and the roots pump are connected in series and are connected with the diffusion pumps through pipes (12 to 14). The first valve 120 is arranged at the end part of the second pipe 12. The holding pump is connected with the diffusion pumps through pipes (15 to 18). The sixth pipe 17 is connected with the first pipe 14 through the eighth pipe 19. The second valve 130 is arranged at the end part of the sixth pipe 17. The box body comprises a box cover 5 and a box base 6. The first air extraction pipe 3 is mounted at the top of the box cover 5. The second air extraction pipe 4 is mounted at the bottom of the box base. A spring tube 23 is arranged at the end part of the second air extraction pipe 4. The first air extraction pipe 3 and the second air extraction pipe 4 are respectively connected with the diffusion pumps 2 and 1. The box cover is fixedly mounted through a support 7. A frame body 21 is fixedly mounted in the box cover. The supporting plate 20 is fixedly mounted in the frame body. The second air cylinders 10 are mounted in the frame body. The second air cylinders 10 are connected with the pressing plate.

Its working principle is as follows: when the system starts working, materials are placed on the supporting plate 20 and the lower pressing plate. The second air cylinders 10 operate to press the materials. Then, the first air cylinders 8 run to drive the box base 6 to move upwards along the rail to be jointed with the box cover 5. The first valve 120 is switched on, the valves 110 and the second valve 130 are switched off, and the rotary vane pump roughly extracts the air. Then, the valves 110 and the second valve 130 are switched on, the first valve 120 is switched off, the diffusion pumps start working to finely extract the air. When the preset pressure value is achieved, the box base returns the bottom along the rail under the action of the air cylinders. The materials are placed again to repeat the operation continuously. When the box base moves under the action of the air cylinders, the light curtain sensors are switched on. The light curtain sensors are switched off when meeting a barrier, and meanwhile, the box base stops working and resets.

The above merely describes preferred specific embodiments of the present invention, but the protection scope of the present invention is not limited thereto. A person skilled in the art can make replacements or modifications within the technical scope of the present invention according to the technical solutions and concepts of the present invention, and these replacements or modifications shall fall within the protection scope of the present invention.

What is claimed is:

1. A large industrial vacuum sealer system, comprising a vacuumizing system and a box body system, wherein the vacuumizing system comprises a roots pump (140), a rotary vane pump (150), a holding pump (160), and diffusion pumps (1) and (2); the roots pump and the rotary vane pump are connected with a first pipe (14); the first pipe (14) is connected with a second pipe (12); the second pipe (12) is connected with a third pipe (13); end ports of the second pipe (12) and the third pipe (13) are located at upper ends of the diffusion pumps, so as to connect the upper ends of the diffusion pumps with the roots pump and the rotary vane pump; a fourth pipe (16) and a fifth pipe (15) are connected with bottoms of the diffusion pumps; the fourth and fifth pipes are communicated with each other and then are connected to a sixth pipe (17); the sixth pipe (17) is connected with the holding pump through a seventh pipe (18) and is connected with the first pipe (14) through an eighth pipe (19).

2. The large industrial vacuum sealer system according to claim 1, wherein a first valve (120) is mounted at an end part of the second pipe (12), and a second valve (130) is mounted at an end part of the sixth pipe (17).

3. The large industrial vacuum sealer system according to claim 1, wherein a box body comprises a box cover (5) and a box base (6); the box body is connected with the diffusion pumps through a first air extraction pipe (3) at a top of the box cover and a second air extraction pipe (4) at a bottom of the box base; an extensible and retractable spring tube (23) is arranged at an end part of the second air extraction pipe (4).

4. The large industrial vacuum sealer system according to claim 3, wherein the box cover is fixedly mounted through a support (7), and the support is fixedly connected to a ground; the box base is capable of moving up and down in a reciprocating manner along guide columns (24) through first air cylinders (8), and the first air cylinders are arranged at four corners of the box base.

5. The large industrial vacuum sealer system according to claim 3, wherein light curtain sensors (9) are mounted at the box cover and the box base.

6. The large industrial vacuum sealer system according to claim 3, wherein a frame body (21) is fixedly mounted in the box cover; encapsulation groups are provided on the frame body; each encapsulation group comprises a fixedly mounted supporting plate and two pressing plates, and the two pressing plates are oppositely symmetrically distributed and capable of synchronously moving by second air cylinders (10).

* * * * *